United States Patent [19]

Crowder, Sr.

[11] Patent Number: 4,546,212

[45] Date of Patent: Oct. 8, 1985

[54] DATA/VOICE ADAPTER FOR TELEPHONE NETWORK

[75] Inventor: Jack L. Crowder, Sr., Mountain View, Calif.

[73] Assignee: Crowder, Inc., Mt. View, Calif.

[21] Appl. No.: 640,308

[22] Filed: Aug. 13, 1984

Related U.S. Application Data

[63] Continuation-in-part of Ser. No. 587,370, Mar. 8, 1984, abandoned.

[51] Int. Cl.[4] .......................................... H04M 11/06
[52] U.S. Cl. ................................ 179/2 C; 179/2 DP; 370/69.1
[58] Field of Search ............................ 179/2 C, 2 DP; 370/69.1, 76

[56] References Cited

U.S. PATENT DOCUMENTS

| | | | |
|---|---|---|---|
| Re. 31,510 | 1/1984 | Carbrey | 370/50 |
| 3,875,339 | 4/1975 | Gruen et al. | 370/41 |
| 4,306,116 | 12/1981 | McClure et al. | 179/2 DP |
| 4,431,867 | 2/1984 | Heatherington | 179/2 C |

Primary Examiner—Thomas W. Brown
Assistant Examiner—W. J. Brady
Attorney, Agent, or Firm—Limbach, Limbach & Sutton

[57] ABSTRACT

A data/voice adapter apparatus for use in a telephone network having two or more stations interconnected by telephone lines. Each station typically includes a computer and associated modem together with a telephone handset. The modem and handset are coupled to the telephone through the subject adapter. When the adapter is in a dial mode, dialing signals are transferred from either the modem or telephone handset to the telephone line so that a telephone hookup to another station can be created. Once the hookup is made, the adapter can be switched to a split mode whereby a relatively low frequency channel is provided for voice communication utilizing the telephone handsets and a relatively high frequency channel is provided for simultaneous data communication utilizing the modems.

14 Claims, 7 Drawing Figures

FIG_2_

DATA/VOICE ADAPTER FOR TELEPHONE NETWORK

CROSS-REFERENCE TO RELATED APPLICATION

The present application is a continuation-in-part application of Ser. No. 587,370 filed on Mar. 8, 1984, now abandoned.

TECHNICAL FIELD

The present invention relates generally to communication equipment and more particularly to an adapter which provides for the simultaneous exchange of digital data and voice information over a single telephone line.

BACKGROUND ART

Telephone lines are commonly used to provide a data communication link between computers and the like. Typically, a modem (acronym for *mo*dulator/*dem*odulator) is used to both convert the digital data from the computer to analog signals capable of being transmitted over telephone lines and to convert analog signals received from the telephone lines to digital data to be forwarded to the computer.

It is often necessary to provide voice communications between computer installations, in addition to computer data. The capability of providing simultaneous voice and computer information is also frequently desirable. If there are two telephone lines available between two installations, simultaneous voice and computer communications can be easily achieved, albeit at increased costs. However, in many applications, only a single telephone line is available between installations. In that event, either voice or computer data can be exchanged, but not simultaneously.

The present invention permits the simultaneous exchange of voice and computer data over a single telephone line. The invention may be easily incorporated into an existing network with little or no modifications of existing equipment. These and other advantages of the subject invention will become apparent to persons having ordinary skill in the art upon a reading of the following Best Mode For Carrying Out The Invention together with the drawings.

DISCLOSURE OF THE INVENTION

A data/voice adapter apparatus for use in a telephone network having a plurality of stations interconnected by telephone lines is disclosed. Each station includes a first communication device, such as computer and an associated modem, and a second communication device, such as a telephone handset. The subject adapter apparatus has a first port to be coupled to the computer modem, a second port to be coupled to the telephone handset and a third port to be coupled to the telephone line.

The subject apparatus also includes a first signal path, for passing signals having a frequency above a first predetermined frequency. In one embodiment the first signal path preferably is in the form of a bi-directional high pass filter. In another embodiment, the first signal path is not filtered. Also included is a second signal path, which passes signals having a frequency below a second predetermined frequency, the second signal path preferably being in the form of a bi-directional low pass filter. A switch means is provided which is switchable between first and second modes. The first mode, which can be referred to as the split mode, cause the first signal path to be coupled between the telephone line port and the modem port and the second signal path to be coupled between the telephone line port and the telephone handset port. When the switch means in the second mode, which can be referred to as the dial mode, the telephone line, modem and telephone handset ports of the subject apparatus are coupled together.

The first and second predetermined frequencies associated with the two signal paths are both typically 800 Hertz. Thus, when the switch means in the split mode, a relatively low frequency channel is provided for voice communications between stations utilizing the telephone handsets. Simultaneously, a relatively high frequency channel is provided for data communications between the same stations using the modems. When a station is attempting to create a telephone line hookup with another station of the network, the switch means is actuated to the dial position. Thus, dialing signals are permitted to pass through the subject apparatus to the telephone line, without interference from the filtering created by the first and second signal paths. Once a hookup has been established, the switch means may be returned to the split position.

BEST MODE FOR CARRYING OUT THE INVENTION

Figure 1:
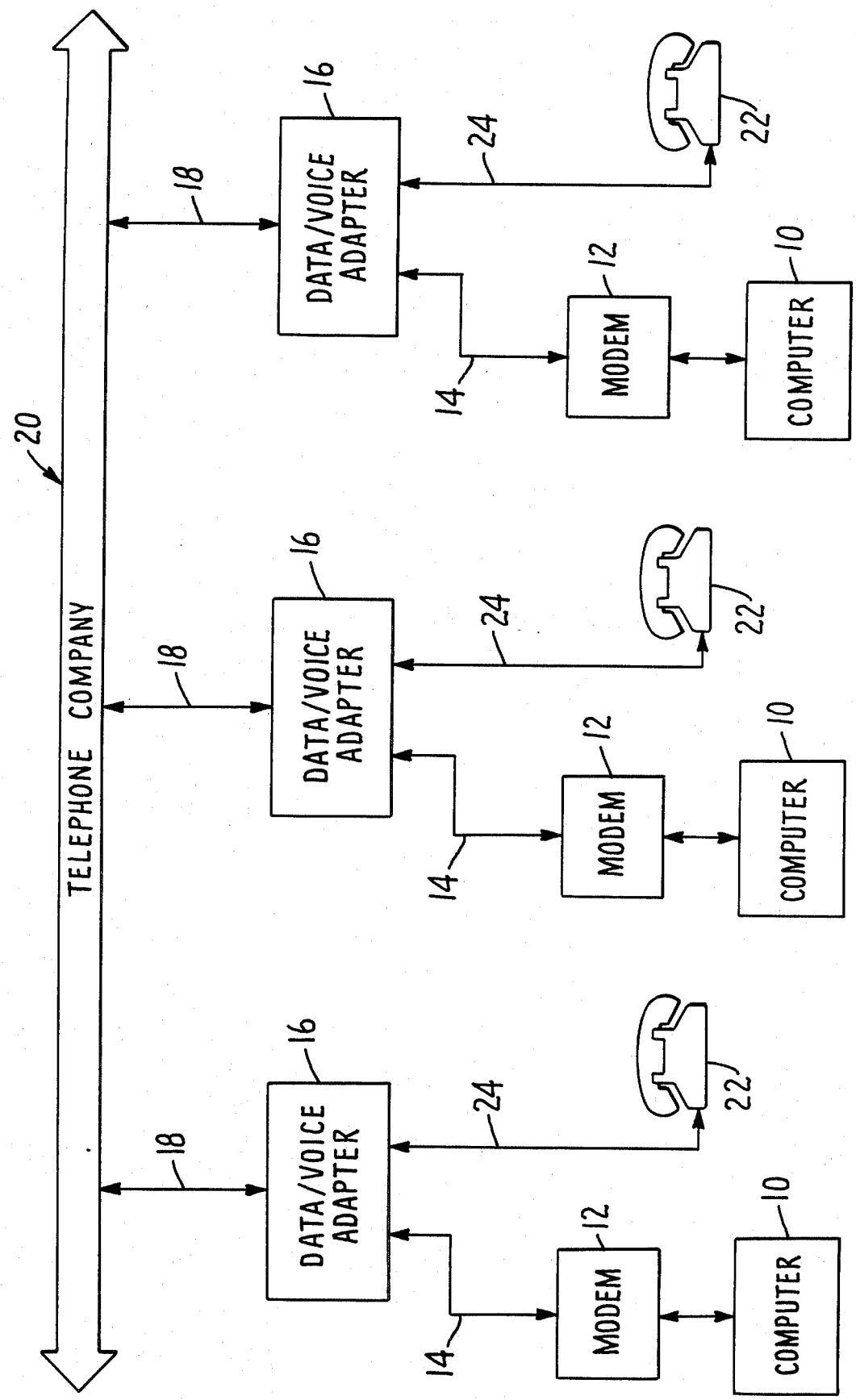
FIG. 1 is a simplified block diagram of an exemplary communication network comprised of three separate stations utilizing the subject invention.

Referring now to the drawings, FIG. 1 shows an exemplary telephone network having three separate stations which are capable of communicating with one another over telephone lines. Each station includes a computer 10 which is coupled to a modem 12. Modem 12 is, in turn, coupled to a data/voice adapter 16, to be subsequently described, as represented by line 14. Each station further includes one or more telephone handsets 22 which are also coupled to data/voice adapter 16, as represented by line 24. Data/voice adapter 16 is coupled to the telephone company telephone lines, generally designated by the numeral 20, as represented by line 18.

Figure 2:
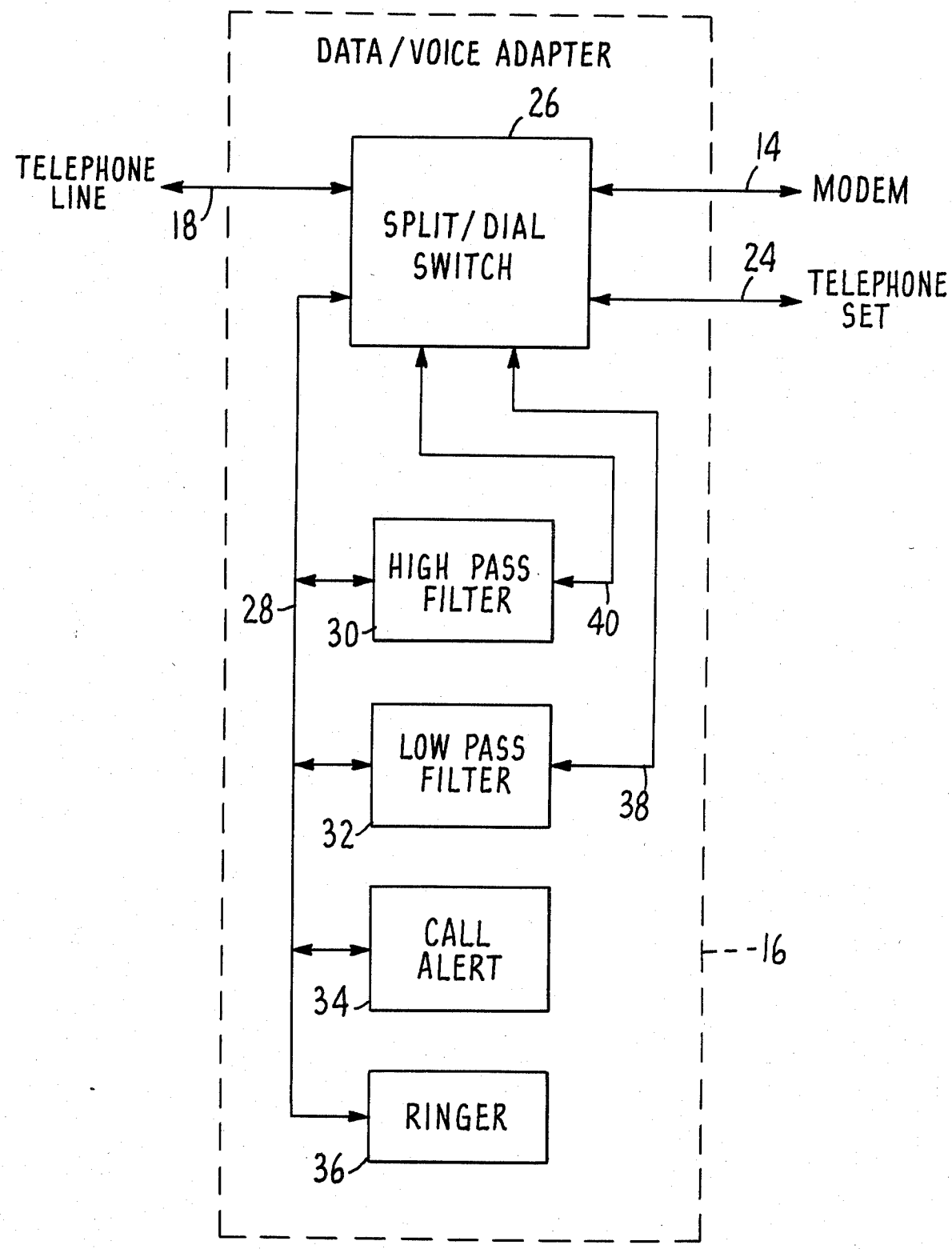
FIG. 2 is a block diagram of the data/voice adapter in accordance with the present invention.

Additional details of data/voice adapter 16 are depicted in FIG. 2. Adapter 16 includes a split/dial switch which may be comprised of various separate mechanical or electronic switches. One terminal of switch 26 is connected to the telephone company lines as represented by line 18. A second terminal of the switch is connected to the modem 12, as indicated by line 14, and a third terminal of the switch is connected to telephone handset 22, as indicated by line 24. Adapter 16 further includes a bi-directional high pass filter 30 and a bi-directional low pass filter 32. Filters 30 and 32 have a common port which is coupled to a fourth terminal of split/dial switch 26, as represented by line 28. High pass filter 30 has a second port which is coupled to a fifth terminal of switch 26, as represented by line 40, and low pass filter 32 has a second port which is connected to still another terminal of switch 26, as represented by line 38.

Bi-directional high pass filter 30 has a low frequency cutoff point of approximately 800 Hertz. Thus, only signal componets having a frequency in excess of 800 Hertz present at either port will be outputted to the opposite port. Bi-directional low pass filter 32 has a high frequency cutoff point of approximately 800 Hertz. Thus, only signals having a frequency component of 800 Hertz or less will be passed from one port of filter 32 to the opposite port.

Adapter 16 further includes a call alert circuit as represented by block 34, which is connected to the fourth terminal of switch 26 by way of line 28. As will be described later in greater detail, call alert circuit 34 is used to call another station in the network or to detect that a call originating from another station is being made to the station associated with the circuit. Switch 26 is further coupled to a ringer circuit represented by block 36 by way of line 28. Ringer circuit 36 causes a audible and a visual signal to be produced when a call to the station is being made.

As will be subsequently described, when switch 26 is in the split position, lines 18 and 14 are coupled together through bi-directional high pass filter 30. Thus, only signals having a frequency component in excess of 800 Hertz are passed between the telephone line and the modem. In addition, switch 26 couples the telephone line and the telephone set together through bi-directional low pass filter 32. Accordingly, only signals having a frequency component less than 800 Hertz are exchanged between the telephone line and the telephone set. Switch 26 also serves to couple the call alert circuit 34 and ringer circuit 36 directly to the telephone line in this mode.

When split/dial switch 26 is in the dial position, the telephone line is coupled directly to both the modem and the telephone set. In this mode, filters 30 and 32, call alert circuit 34 and ringer circuit 36 are switched out of the system.

Figure 3:
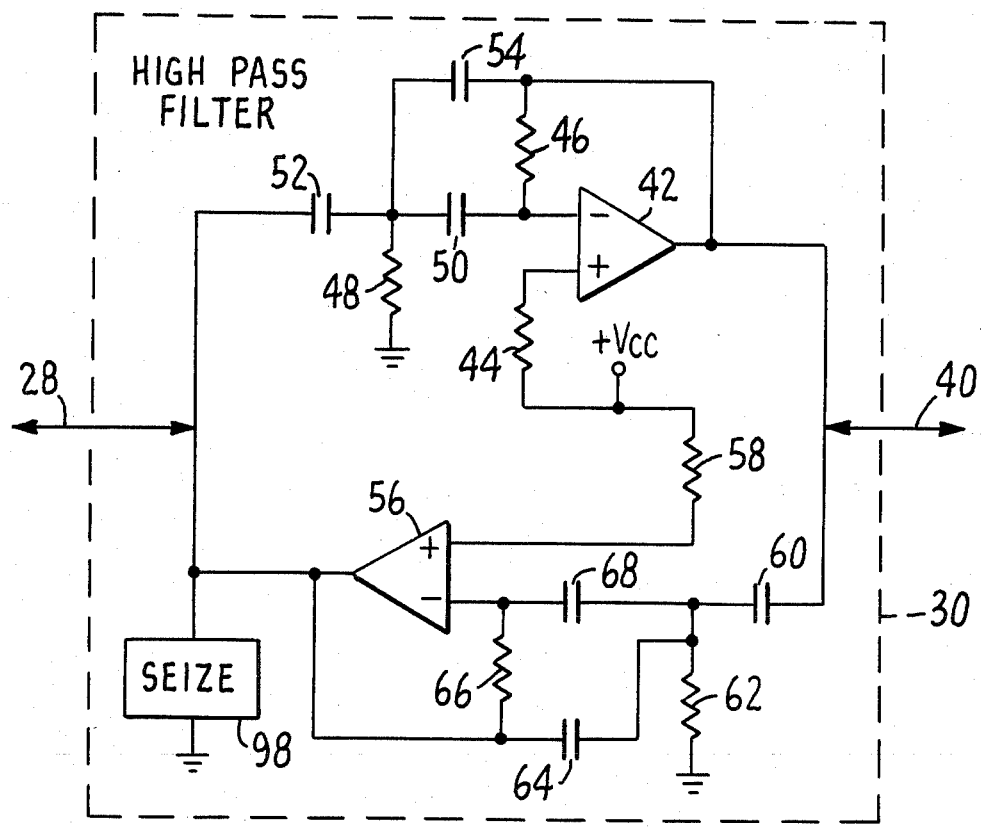
FIG. 3 is a schematic circuit diagram of the bi-directional high pass filter used in the subject data/voice adapter.

Referring now to FIG. 3, bi-directional high pass filter 30 is preferably comprised of two identical uni-directional active high pass filters connected in parallel in opposite directions. The filter for coupling signals from the telephone line to the modem includes a conventional operational amplifier 42. The non-inverting input of amplifier 42 is connected to a positive supply voltage $+V_{cc}$ by way of a resistor 44. The inverting input of amplifier 42 is connected to the amplifier output through a resistor 46. The inverting input is also coupled to line 28 through series-connected capacitors 50 and 52. A resistor 48 is connected between the juncture of capacitors 50 and 52 and ground and a third capacitor 54 is connected between the juncture and the output of the amplifier. The output of amplifier 42 is also conencted to line 40.

The second uni-directional active high pass filter which couples signals from the modem to the telephone line also includes a conventional operational amplifier 56. The non-inverting input of amplifier 56 is coupled to positive supply voltage $+V_{cc}$ through a resistor 58. The inverting input of amplifier 56 is connected to the output of the amplifier through resistor 66. The inverting input is also coupled to line 40 through a pair of series-connected capacitors 60 and 68. The juncture of capacitors 60 and 68 is connected to ground through a resistor 62 and connected to the output of amplifier 56 through capacitor 64. The output of amplifier 56 is also connected to line 28. As will be described later in greater detail, a seize circuit represented by block 98 is connected between line 28 and ground. The purpose of seize circuit 98 is to seize the telephone line when an incoming call is answered by the modem.

Figure 4:
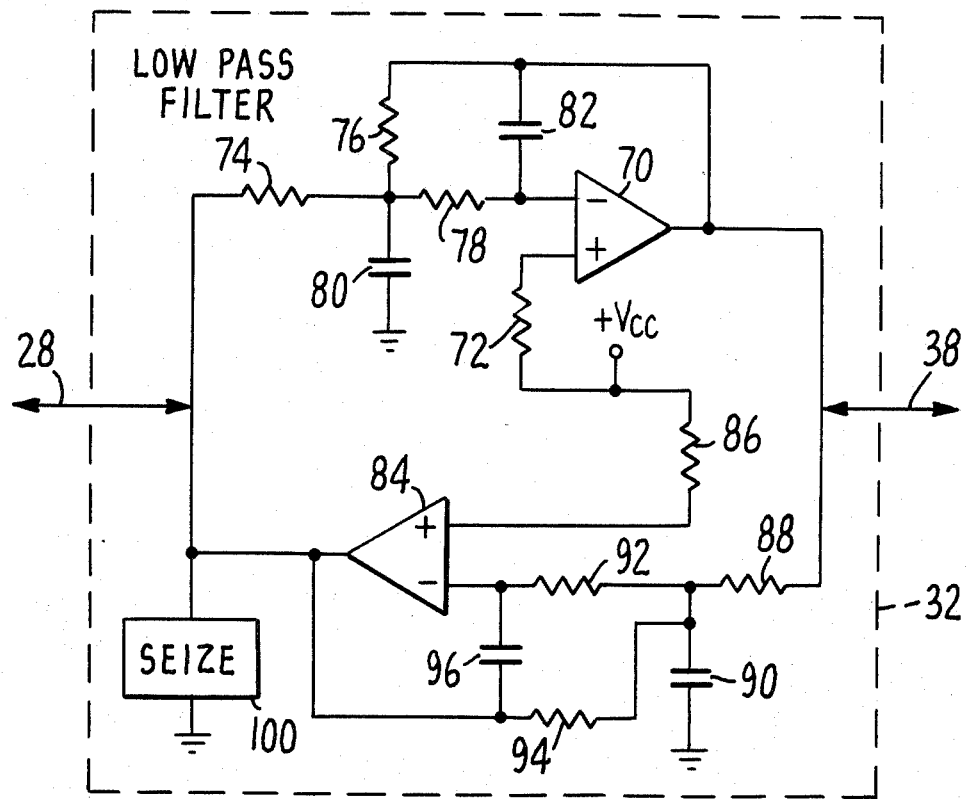
FIG. 4 is a schematic circuit diagram of the bi-directional low pass filter used in the subject data/voice adapter.

FIG. 4 shows the circuit details of bi-directional low pass filter 32. Low pass filter 32 also includes a pair of identical parallel-connected active filters, both being low pass filters with a cutoff point of 800 Hertz. Signals present on line 28 from the telephone line are coupled to line 38 of the telephone set by way of a uni-directional low pass active filter which includes a conventional operational amplifier 70. The non-inverting input of amplifier 70 is connected to a positive supply voltage $+V_{cc}$ by way of a resistor 72. The inverting input of amplifier 70 is connected to the output of the amplifier by way of capacitor 82, with the output of the amplifier also being coupled to line 38. The inverting input of amplifier 70 is coupled to line 28 through a pair of series-connected resistors 74 and 78. The connection between resistors 74 and 78 is coupled to ground through a capacitor 80 and to the output of amplifier 70 by way of resistor 76.

Signals present on line 38 from the telephone set are coupled to the telephone line through line 28 by way of a second uni-directional low pass filter which includes a conventional, operational amplifier 84 having a non-inverting input which is connected to positive supply voltage $+V_{cc}$ through a resistor 86. The inverting input of amplifier 84 is connected to the output of the amplifier through capacitor 96, with the output of the amplifier also being connected to line 28. The inverting input of amplifier 84 is coupled to line 38 through a pair of series-connected resistors 88 and 92, with the connection between the two resistors being coupled to ground through a capacitor 90 and coupled to the output of the amplifier by way of a resistor 94. Seize circuit 100 is provided which is connected between line 28 and ground and serves to seize the telephone line when an incoming call is answered by the telephone handset.

Figure 5:
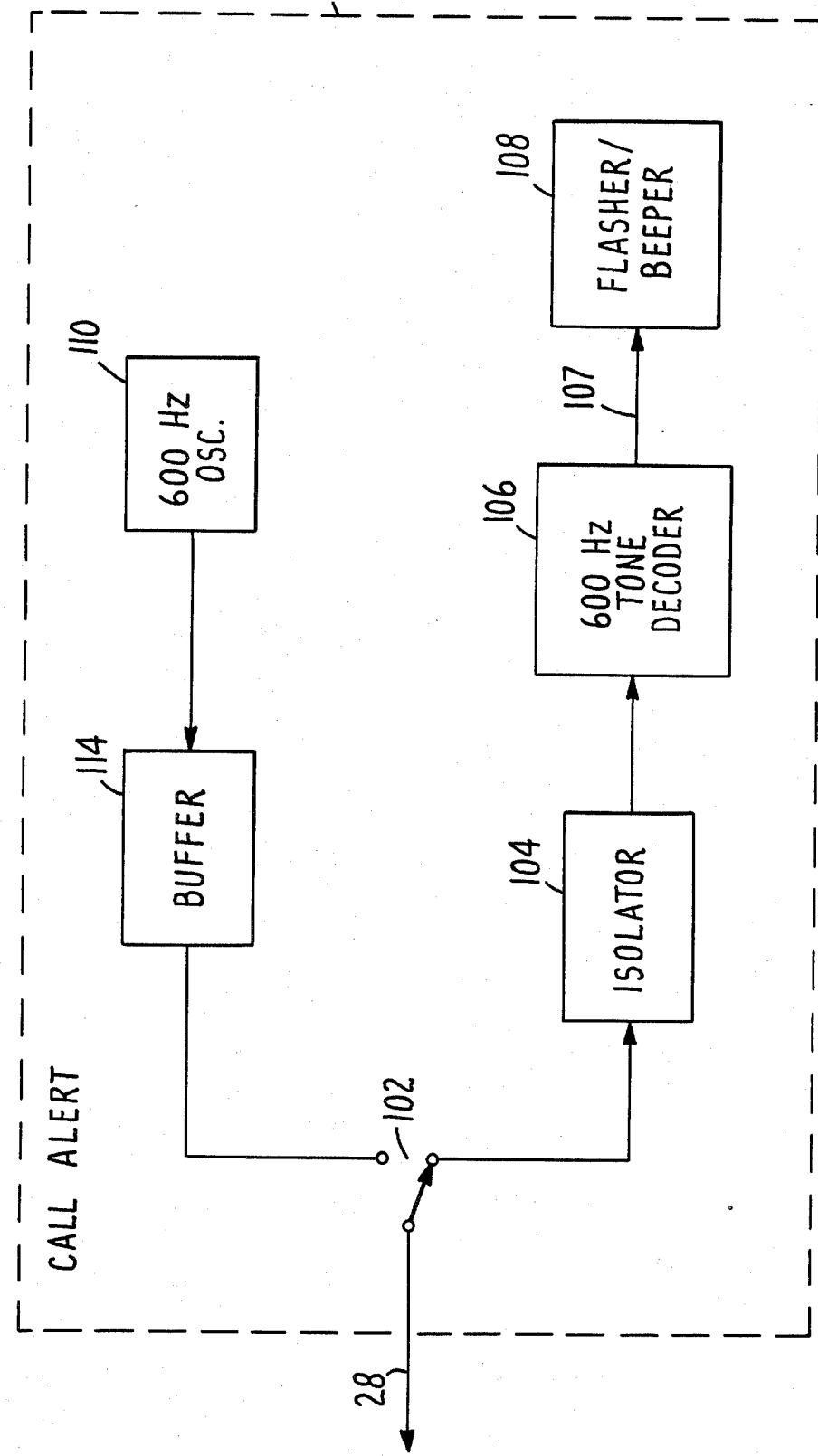
FIG. 5 is a block diagram of the call alert circuit used in the subject data/voice adapter.

Additional details regarding call alert circuit 34 of the data/voice adapter may be seen in FIG. 5. As previously noted, call alert circuit 34 serves the function of signaling another station of the network when a call is to be made and detecting alert signals sent by other stations. The circuit only functions after a telephone connection has been established by using conventional dialing signals produced by either modem 12 or telephone handset 22. Alert circuit 34 is provided with an oscillator, represented by block 110, having an output frequency below the cutoff frequency of filters 30 and 32, typically 600 Hertz. The output of oscillator 110 is connected to a buffer circuit represented by block 114. Buffer circuit 114 includes an internal buffer amplifier followed by an impedance matching transformer which matches the impedance of the call alert circuit to that of the telephone line, such impedance preferably being greater than 900 ohms. The output of buffer circuit 114 is connected to line 28 through a single pole double throw switch 102.

Call alert circuit 34 further includes a tone decoder circuit represented by block 106. Decoder circuit 106, which typically includes a phased lock loop, produces an output signal on line 107 when a 600 Hertz tone produced by a call alert circuit of another station is present on the telephone line. The output signal is forwarded to a flasher/beeper circuit represented by block 108 which includes an audio transducer and a flasher for producing an audible and visual signal when a tone is detected. An isolator circuit 104 is connected between line 28, through switch 102, and the input of tone decoder 106. Isolator 104 includes an optical coupler which serves to electrically isolate decoder 106 from the telephone line. Switch 102 normally couples the tone decoder 106 to the telephone line, with actuation of the switch causing the decoder to be disconnected and the output of oscillator 110 to be connected to the line.

Figure 6:
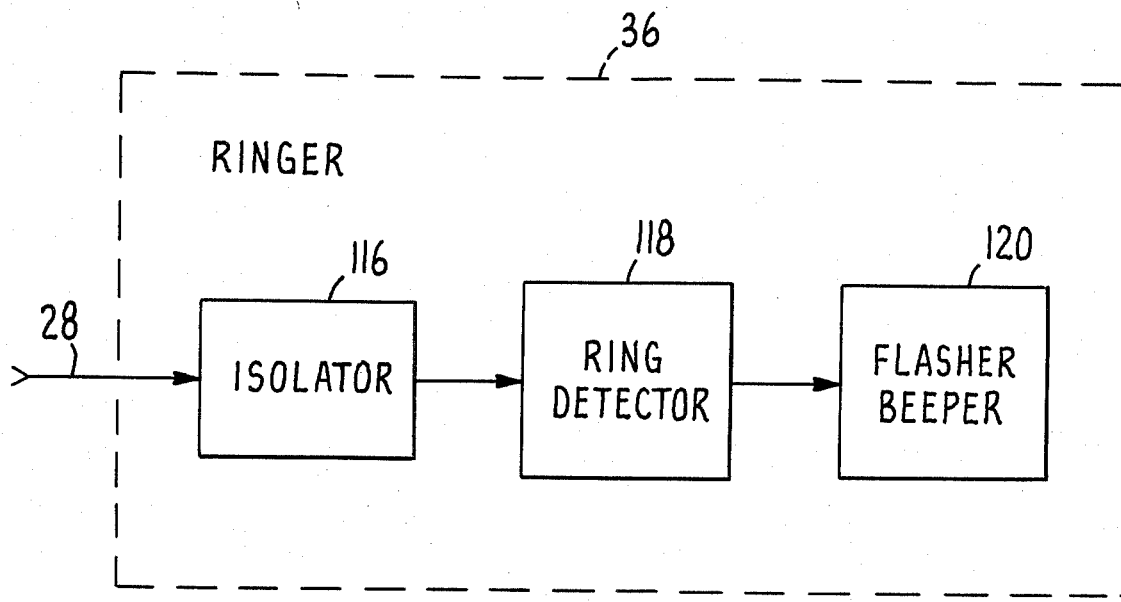
FIG. 6 is a block diagram of the ringer circuit used in the subject data/voice adapter.

Referring now to FIG. 6, ringer circuit 36 includes a ring detector represented by block 118. Ring detector 118 produces an output signal when a ringing signal is present on the telephone line. Detector 118 preferably includes a phase lock loop set to the frequency of the ringing signal, typically 20 Hertz. The output of detector 118 is connected to a flasher/beeper circuit 120 similar to circuit 108 of the call alert circuit. Flasher/beeper 128 produces an audible and visual signal when ring detector circuit 118 produces an output. An isolator circuit 116 is disposed between the input of ring detector 118 and line 28. Circuit 116 includes an optical isolator and serves to electrically isolate the ring detector from the telephone line.

Figure 7:
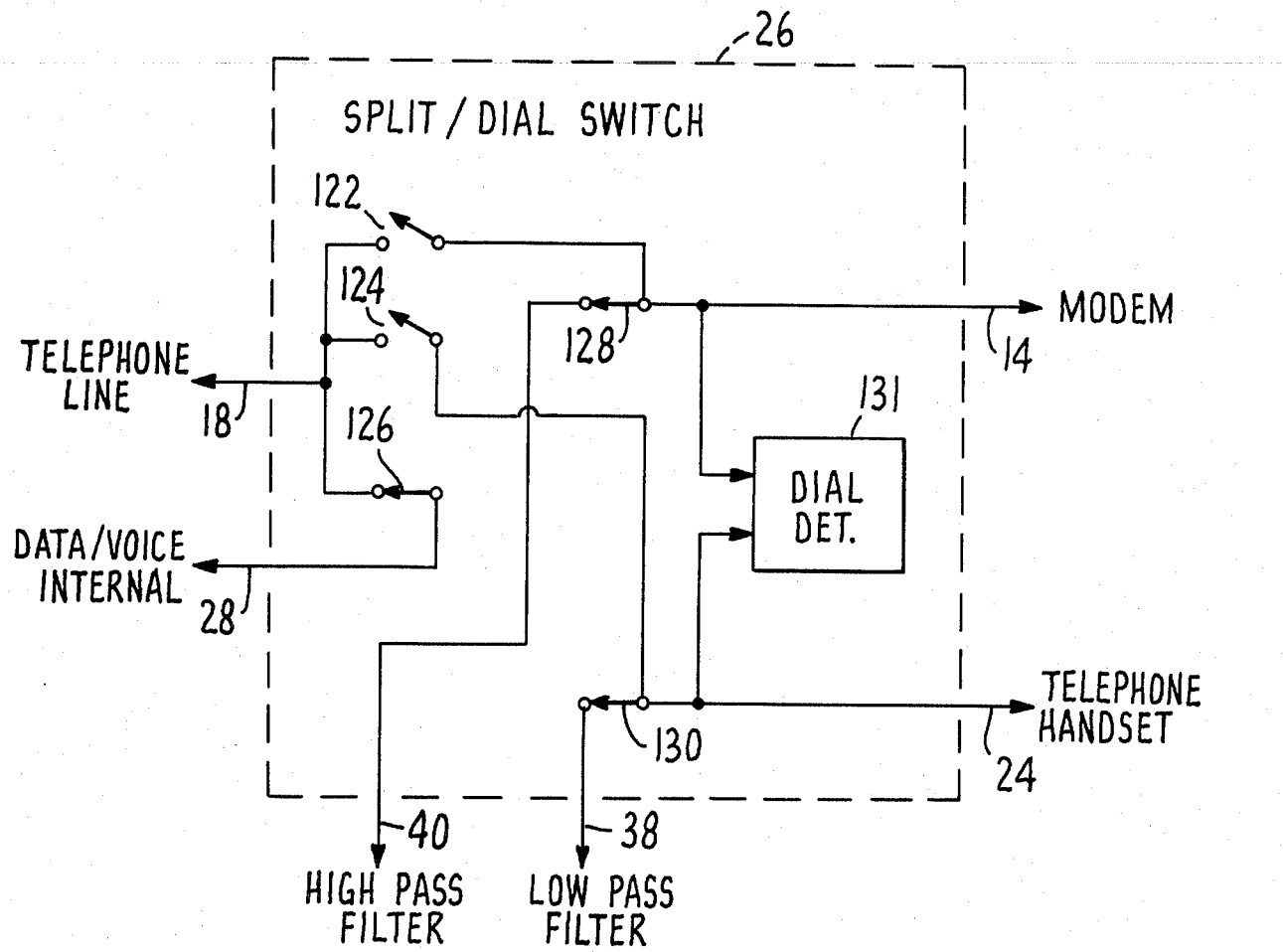
FIG. 7 is a schematic diagram of the split/dial switch of the subject invention showing the switch in the split mode.

A schematic representation of split/dial switch 26 is shown in FIG. 7. The switch is comprised of five sets of switch contacts and may be implemented using conventional relays or solid state switches. Switch 26 has two positions including a split position and a dial position. Switch 26 includes three contact pairs 122, 124 and 126, with each pair having a contact connected to telephone line 18. The remaining contact of pair 122 is connected to modem line 14 and the remaining contact of pair 124 is connected to telephone handset line 24. The remaining contact of contact pair 126 is coupled to line 28 which is connected, as depicted in FIG. 2, to filters 30 and 32, call alert circuit 34 and ringer circuit 36. Split/dial switch 26 further includes contact pairs 128 and 130. One contact of contact pair 128 is connected to line 40 of high pass filter 30 and one contact of contact pair 130 is connected to line 38 of low pass filter 32. The remaining contact of contact pair 128 is connected to modem line 14 and the remaining contact of contact pair 130 is connected to telephone handset line 24. Switch 26 also may include an optional dialing signal detect circuit 131 which is connected to both the modem line 14 and the telephone handset line 24. Circuit 131 detects the presence of dialing signals on lines 14 and 24 and causes switch 26 to switch from the split mode to the dial mode.

The five pairs of commonly-actuated make before break switch contacts are shown in FIG. 7 in the split position with contacts 122 and 124 being open and contacts 126, 128 and 130 being closed. When switch 26 is actuated to the dial position, contacts 122 and 124 are closed and contacts 126, 128 and 130 are open. Switch 26 is normally in the split mode. When dialing signals are detected on either the modem line 14 or the telephone handset line 24, dial detect circuit 131 causes switch 26 to immediately switch to the dial state. If circuit 131 is deleted, switch 26 is implemented to be manually actuated prior to dialing.

Having described the construction of the subject data/voice adapter, operation of an exemplary telephone network utilizing the subject adapter will now be given. A typical telephone line has a bandwidth which extends approximately from 0–3 kHz. Generally, the subject adapter splits the band pass of the telephone line into two frequency channels, including a low frequency channel and a high frequency channel. The low frequency channel extends approximately from 0–800 Hz and is used for voice communication. The high frequency channel extends approximately from 800–3 kHz and is used for data communications. Inasmuch as the primary components of human voice fall between 80 and 400 Hertz, the low frequency channel has more than sufficient bandwidth.

TABLE 1

| 0–300 BAUD MODEM FREQUENCIES | | | |
|---|---|---|---|
| | | MARK (1) | SPACE (0) |
| ORIGINATE | Transmit | 1270 Hz | 1070 Hz |
| | Receive | 2225 Hz | 2025 Hz |
| ANSWER | Transmit | 2225 Hz | 2025 Hz |
| | Receive | 1270 Hz | 1070 Hz |

TABLE 2

| 1200 BAUD MODEM FREQUENCIES | | |
|---|---|---|
| | TRANSMIT | RECEIVE |
| ORIGINATE | 1200 Hz | 2400 Hz |
| ANSWER | 2400 Hz | 1200 Hz |

Tables 1 and 2 set forth the operating frequencies of two types of standard modems commonly used on telephone lines. Table 1 relates to a 0–300 baud modem which utilizes frequency shift keying (FSK) and Table 2 relates to a 1200 baud modem which utilizes phase shift modulation. When the 0–300 baud modem has originated a call, the modem output frequency shifts between 1270 Hertz and 1070 Hertz in the transit mode and between 2225 and 2025 Hertz in the receive mode. When the modem has answered a call, the output frequency shifts between 2225 Hertz and 2025 Hertz in the transmit mode and 1270 Hertz and 1070 Hertz in the receive mode. When the 1200 baud modem has originated a call, the phase shifted output frequency is at 1200 Hertz when transmitting and 2400 Hertz when receiving. When the modem has answered a call, the output frequency is at 2400 Hertz when transmitting and 1200 Hertz when receiving. Thus, the output frequencies of both types of standard modems fall well within the 800 to 3 kHz bandpass of the high frequency channel.

If a telephone call is to be made from one station to another station of the network, or from one station of the network to any other telephone, dialing signals are produced either by modem 12 or telephone handset 22. Such dialing signals are detected by the dial detector circuit 131 in the split-dial switch 26 thereby causing the switch to change from the split mode to the dial mode. In the event the dial detector circuit is deleted, switch 26 must be manually actuated to the dial mode before dialing is commenced. Contact pairs 122 and 124 of switch 26 are closed in the dial mode thereby connecting the modem and the telephone handset directly to the telephone line, so as to bypass filters 30 and 32.

If the call is directed to another station in the network, the resultant ringing signals will be present on the line 18 connected to the data/voice adapter 16 of the station. The split/dial switch 26 of the station is normally in the split mode, therefore, the ringing signals will be coupled through contact pairs 126 of the switch to ringer circuit 36 by way of line 28. The ringing signals will be coupled to the ring detector circuit 118 through isolator circuit 116. Detector circuit 118 will then cause flasher/beeper circuit 120 to emit an audible and visual signal. The call will then be answered by either the modem 12 or telephone handset 22. In the event the call is answered by the modem, the modem will cause seize circuit 98 (FIG. 3) of the high pass filter circuit 30 to seize the telephone line by inserting a relatively low impedance across the line. In the event a call is answered by the telephone handset, a signal will be issued to seize circuit 100 located in the low pass filter circuit 32, thereby causing the telephone line to be seized. If the split/dial switch 26 of the answering station had been in the dial position, the ringing signals would be directly detected through switch 26 by either the modem or the telephone handset and the ringer circuit is not utilized.

Once the dialing signals from the originating station have terminated, the dial detect circuit 131 will cause the split/dial switch 26 of the originating station to revert back to the normal split mode. Thus, switches 26 of both the originating and answering stations will be in the split mode at this time. Voice communication by way of the telephone handsets is then carried out over the low frequency channel. Meanwhile, data communication between the two modems can be carried out over the high frequency channel.

Once two stations in the network have established a telephone hookup and data is being exchanged over the high frequency channel, it may be necessary for one station to signal the other station that voice communication is desired. One station can inform the other station by either sending a message over the high frequency data link or by using the call alert feature. The call alert circuit is activated by manually actuating switch 102 (FIG. 5) thereby causing the 600 Hertz tone out of buffer 114 to be connected to line 28 which is connected to the telephone line 18 by way of split/dial switch 26. The tone is received by the call alert circuit 34 of the receiving station and the 600 Hertz tone decoder circuit 106 causes flasher/beeper circuit 108 to signal the operator to pick up the telephone handset. Note that the frequency used by the call alert circuit 34 is less than 800 Hertz, therefore the tone will not interfere with data transmissions on the high frequency channel.

High pass filter 30 provides two functions. At the transmitting end, the filter prevents the data signals on the high frequency channel from entering into the low frequency channel. At the receiving end, the high pass filter further prevents the voice signals from being received by the modem. A similar but complimentary function is performed by low pass filter 32. The low pass filter at the transmitting end prevents the voice signals from entering the high frequency channel and, at the receiving end, prevents the data signals being received by the telephone set.

As can be seen from the frequencies set forth in Tables 1 and 2, many typical modems do not transmit data have any substantial frequency component which falls within the low frequency channel range. Even if some interferring signals originating from the modems are introduced into the low frequency channel, satisfactory voice communication can be carried out. However, it is possible that signals can be produced by a telephone set which will enter the high frequency channel. Such signals are likely to produce errors in the digital data, this being highly undesirable.

In an alternative embodiment of the subject invention, the bi-directional high pass filter 30 is replaced with a short circuit. In that event, it would be necessary to utilize bi-directional low pass filters having a sharp cut-off frequency since there will not be a high pass filter at the receiving end to further ensure that signals on the low frequency channel are not received by the modem.

A bi-directional twelfth order low pass filter having a low frequency cut off of approximately 800 Hz has been found suitable for the present application in the event the high pass filter is to be deleted. Each half of the twelfth order bi-directional filter may be constructed utilizing three dual operational amplifier circuits manufactured by Texas Instruments under the designation TI1458. A total of six series-connected active filter stages are used for each half of the filter, with each stage including an operational amplifier and associated RC components configured essentially the same as the single stage active filters depicted in FIG. 4.

Thus, a novel data/voice adapter for use in a telephone network has been disclosed. Although two embodiments of the adapter have been described in some detail, it is to be understood that certain changes can be made by persons having average skill in the art without departing from the spirit and the scope of the invention as defined by the appended claims.

I claim:

1. A data/voice adapter apparatus for use in a telephone network having a plurality of stations interconnected by telephone lines, with each station having first and second communication devices and one of said adapter apparatus, said adapter apparatus comprising:
   a first port for coupling to the first communications device;
   a second port for coupling to the second communications device;
   a telephone line port for coupling to the telephone line;
   filter means for providing a first signal path for signals above a first predetermined frequency and a second signal path for signals below a second predetermined frequency;
   switching means for providing a first switch mode wherein said first signal path is coupled between said first port and said telephone line port and said second signal path is coupled between said second port and said telephone line port and a second switch mode wherein said first, second and telephone line ports are coupled together.

2. The adapter apparatus of claim 1 further comprising ringing detector means for detecting ringing signals on the telephone line at said telephone line port.

3. The adapter apparatus of claim 1 further comprising call alert means for generating and detecting signaling tones on the telephone line at said telephone line port.

4. The adapter apparatus of claim 3 wherein said signaling tones have a frequency less than said second predetermined frequency.

5. The adapter apparatus of claim 1 wherein said first and second predetermined frequencies are substantially the same.

6. The adapter apparatus of claim 1 wherein said second signal path includes a bi-directional filter with a high frequency cutoff at said second predetermined frequency.

7. The adapter apparatus of claim 6 wherein said bi-directional filter is a low pass filter.

8. The adapter apparatus of claim 7 further comprising call alert means for generating and detecting signaling tones on the telephone line at said telephone line port.

9. The adapter apparatus of claim 8 further comprising ringing signal detecting means for detecting ringing signals on the telephone line at said telephone line port.

10. The adapter apparatus of claim 9 wherein said first signal path of said filter means includes a second bi-directional filter with a low frequency cutoff at said first predetermined frequency.

11. The adapter apparatus of claim 9 wherein said second bi-directional filter is a high pass filter.

12. A data/voice adapter circuit for use in a telephone network having a plurality of stations inter-connected by telephone lines, the stations each having a modem coupled to data processing equipment, a telephone and said adapter circuit, said adapter circuit comprising:

a first port for coupling to the modem;

a second port for coupling to the telephone handset;

a telephone line port for coupling to the telephone lines;

first filter means for providing a first signal path for signals above a predetermined frequency;

second filter means for providing a second signal path for signals below a second predetermined frequency;

switching means for providing a first switch mode wherein said first signal path is coupled between said first port and said telephone line port and said second signal path is coupled between said second port and said telephone line port and a second switch mode wherein said first port and said telephone line port are coupled together bypassing said first filter means.

13. The adapter circuit of claim 12 wherein said switching means also couples said second port to said telephone line port in said second switch mode bypassing said second filter means and said adapter circuit further comprises:

call alert means for generating and detecting signaling tones on the telephone line at said telephone line port; and ringing detector means for detecting ringing signals at said telephone line port.

14. The adapter circuit of claim 13 wherein said first filter means includes a bi-directional high pass filter and said second filter means includes a bi-directional low pass filter.

* * * * *